US012662599B2

(12) United States Patent
Schwarz

(10) Patent No.: US 12,662,599 B2
(45) Date of Patent: Jun. 23, 2026

(54) MODIFIED OVERPRINT VARNISH

(71) Applicant: TOPPAN THERMOFORMED PACKAGING HOLDINGS, INC., Charlotte, NC (US)

(72) Inventor: Richard Schwarz, Kyle, TX (US)

(73) Assignee: TOPPAN THERMOFORMED PACKAGING HOLDINGS, INC., Charlotte, NC (US)

( * ) Notice: Subject to any disclaimer, the term of this patent is extended or adjusted under 35 U.S.C. 154(b) by 646 days.

(21) Appl. No.: 18/074,051

(22) Filed: Dec. 2, 2022

(65) Prior Publication Data

US 2024/0182720 A1    Jun. 6, 2024

(51) Int. Cl.
　*C09D 4/06*　　　(2006.01)
　*C09D 11/023*　　(2014.01)
　*C09D 11/06*　　　(2006.01)

(52) U.S. Cl.
　CPC .............. *C09D 4/06* (2013.01); *C09D 11/023* (2013.01); *C09D 11/06* (2013.01)

(58) Field of Classification Search
　CPC ..................................................... C09D 5/02
　See application file for complete search history.

(56) References Cited

U.S. PATENT DOCUMENTS 3,935,124 A    1/1976　Thene et al.
2003/0176536 A1*　9/2003　Rathschlag .......... C09D 17/004
　　　　　　　　　　　　　　　　　　　　　523/171

2006/0211808 A1　9/2006　Frei et al.
2010/0330279 A1*　12/2010　Fogden .................... C09D 7/67
　　　　　　　　　　　　　　　　　　　　　427/430.1
2017/0113965 A1　4/2017　Siebers et al.
2019/0016872 A1　1/2019　Oka
2020/0317952 A1*　10/2020　Freeman ................. C08K 5/19
2021/0371691 A1　12/2021　Karan et al.
2022/0185556 A1*　6/2022　Schwarz ................ B29C 48/21

FOREIGN PATENT DOCUMENTS

CN　　202781583 U　　3/2013
CN　　103289385 A　　9/2013
CN　　104804562 A　　7/2015
CN　　106243949 A　　12/2016
CN　　106675135 A　　5/2017
CN　　208930867 U　　6/2019
CN　　109988453 A　　7/2019
(Continued)

OTHER PUBLICATIONS

Gonzalez et al. Effects of Oil Phase on the Inversion of Pickering Emulsions Stabilized by Palmitic Acid Decorated Silica Nanoparticles. Colloids and interfaces. vol. 6. Apr. 2022 (Year: 2022).*

(Continued)

*Primary Examiner* — Cachet I Proctor
(74) *Attorney, Agent, or Firm* — Nelson Mullins Riley & Scarborough LLP

(57)　　　　　ABSTRACT

In an embodiment, the invention comprises a thermoformable sheet which comprises a polymer layer, and a barrier layer disposed adjacent the polymer layer. The barrier layer comprises a plurality of particles coated in an adhesion promotor. The plurality of coated particles are dispersed in a barrier solution of polyvinyl alcohol.

14 Claims, 10 Drawing Sheets

(56)  References Cited

FOREIGN PATENT DOCUMENTS

| CN | 114161797 A | 3/2022 |
| EP | 0305922 A2 | 3/1989 |
| KR | 20030021621 A | 3/2003 |
| WO | 2015093450 A1 | 6/2015 |

OTHER PUBLICATIONS

Leterrier et al.; Durability of nanosized oxygen-barrier coatings on polymers; Abstract; Published in Progress in Materials Science, vol. 48, Issue 1 p. 1 (Jan. 2003); [Downloaded from https://infoscience. epfl.ch/record/87889/files/ on Dec. 2, 2022].

International Search report and Written Opinion for Int. App. No. PCT/US2023/037247: Dated Feb. 8, 2024; 10 pages.

* cited by examiner

230

240

251

245

MODIFIED OVERPRINT VARNISH

FIELD OF THE INVENTION

The present invention relates generally to overprint varnishes for polymeric materials. More particularly, the invention relates to improvements in overprint varnish coating for use in formable sheets and thermoformed containers.

BACKGROUND

Overprint varnishes are used to protect the barrier layer of a polymeric material, and more particularly thermoformed products. Exposure of the barrier layer may cause the barrier layer to break down, and transfer to a wet surface thereby creating a tacky feel on the contact surface (e.g., hands and/or countertops).

The use of an overprint varnish may improve the barrier durability and thereby reduce or eliminate any unwanted tacky feel or barrier transfer. However, some overprint varnishes may be water sensitive, and thus, may also transfer to wet surfaces (e.g., hands and/or counter tops), and the degraded overprint varnish may further expose the barrier layer causing the undesired tacky feel.

The present inventors, through ingenuity and hard work, have developed food-contact packaging materials and structures which have a unique synergy, providing various advantages to the ultimate packaging structure, such as improved overprint varnish qualities and/or improved consistency in overprint varnish qualities upon thermoforming of a polymeric sheet. As such, the packaging materials and structures of the present invention better ensure the necessary barrier qualities. The inventive materials and packaging meet and exceed existing industry requirements for, hot fill capability of at least 180° F., trimability, oil resistance, acidic resistance, toughness requirements, and heat-sealing capability.

BRIEF SUMMARY

In some embodiments of the present invention, a modified overprint varnish is provided. The modified overprint varnish may include a base overprint varnish (also referred to as OPV) and an additive. The base OPV may be a water-based emulsion of polymeric droplets and the additive may be a moisture resistant agent, for example an inorganic particle. The base OPV may surround the moisture resistant agent, without adhering to the moisture resistant agent, such that the water-based emulsion of the base OPV remains intact. After application, the modified OPV may be dried and the moisture resistant agent may form a surface shield to prevent the OPV from transferring to wet and/or greasy surfaces.

In an example embodiment a method of forming a modified over print varnish is provided. The method comprises coating a moisture resistant agent with a fatty acid. The method continues by dispersing the coated moisture resistant agent in an over print varnish comprising a water-based emulsion of polymeric droplets. The method continues by mixing the coated moisture resistant agent and the over print varnish to form a mixture, and drying the mixture to evaporate at least sone of the water from the over print varnish.

In some embodiments, the mixing step may create a heterogenous system. In some embodiments, during the drying step the polymer droplets may coalesce into a film. In some embodiments, the over print varnish may be selected from the group consisting of an acrylic emulsion, acrylic emulsion with a thickener, and a polyvinyl acetate-polyethylene copolymer. In some embodiments, the polymeric droplets may provide a solids content between about 40% and about 60% of the total over print varnish. In some embodiments, the polymeric droplets may be liquid droplets with a size of between about 20 nm and about 200 nm. In some embodiments, the moisture resistant agent may be a plurality of particles. In some embodiments, the plurality of particles may be inorganic. In some embodiments, the plurality of particles may be high aspect ratio particles. In some embodiments, the plurality of particles may be spherical particles. In some embodiments, the moisture resistant agent may be selected from the group consisting of talc, wax, or silicon dioxide. In some embodiments, the plurality of particles may be talc particles having a size between about 1 um and 7 um.ise the fatty acid may comprise stearic acid. In some embodiments, the method may further comprise drying the fatty acid coating before dispersing the coated moisture resistant agent.

In another example embodiment a method of making a packaging structure is provided. The method comprises coating a plurality of particles with a fatty acid and dispersing the plurality of coated particles in an over print varnish comprising a water-based emulsion of polymeric droplets. The method continues by mixing the coated plurality of particles and the over print varnish to form a modified over print varnish. The method continues by applying a barrier coating to a thermoformable polymer sheet and applying the modified over print varnish to the barrier coating. The method continues by drying the modified over print varnish. The method continues by stretching the thermoformable polymer sheet into a packaging structure shape and cooling the packaging structure.

In some embodiments, the method may further comprise drying the barrier coating. In some embodiments, the modified over print varnish may reduce chemical transfer of the barrier coating during handling. In some embodiments, the modified over print varnish may be applied with a rod or roll. In some embodiments, the rod or roll may be smooth. In some embodiments, the rod or roll may comprise a plurality of openings, and the opening size of each of the plurality of openings may be larger than a size of the coated particle.

In yet another example embodiment a thermoformable polymeric sheet is provided. The thermoformable polymeric sheet comprises a polymer layer, wherein the polymer layer is thermoformable. The thermoformable polymeric sheet further comprises a barrier layer disposed adjacent to the polymer layer. The thermoformable polymeric sheet further comprises a polymeric over print varnish disposed adjacent the barrier layer opposite the polymer layer. The over print varnish comprises fatty-acid coated particles entrapped therein.

In some embodiments, the particles may be high aspect ratio particles. In some embodiments, the particles may be one of talc, wax or silicone dioxide. In some embodiments, the fatty acid may comprise steric acid. In some embodiments, the barrier layer may be water based. In some embodiments, the polymeric over print varnish may be selected from the group consisting of an acrylic emulsion, acrylic emulsion with a thickener, and a polyvinyl acetate-polyethylene copolymer. In some embodiments, a container may be thermoformed from the thermoformable polymeric sheet.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 1 illustrates a cross-sectional view of a composition of a laminate comprising the inventive composition, in accordance with some embodiments of the present invention;

FIGS. 2A-C illustrate example modified overprint varnish compositions in accordance with some embodiments of the present invention;

DETAILED DESCRIPTION

The present invention will now be described more fully hereinafter with reference to the accompanying drawings in which some but not all embodiments of the inventions are shown. Indeed, these inventions may be embodied in many different forms and should not be construed as limited to the embodiments set forth herein; rather these embodiments are provided so that the disclosure will satisfy legal requirements. Like numbers refer to like elements throughout.

In an embodiment the invention provides a modified overprint varnish (modified OPV) for polymer sheets, and in particular for polymer sheets that will be thermoformed into containers. In an embodiment, the modified OPV comprises a base OPV substance containing an additive, for example a moisture resistant agent. In some embodiments, the moisture resistant agent may be a plurality of inorganic particles. The modified OPV may be applied to a barrier layer of a polymeric sheet to form the outer layer of the polymeric sheet.

Figure 1:
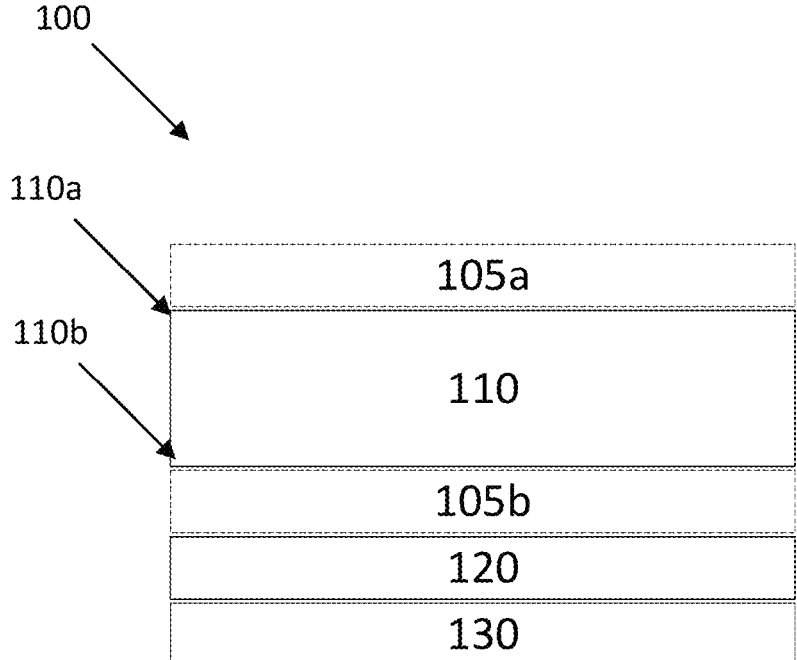

In an embodiment, the invention comprises a packaging structure or thermoformable polymeric sheet comprising multiple layers. In an embodiment, shown in FIG. 1, a thermoformable polymeric sheet 100 may be formed with a polymer layer 110, a barrier layer 120 and a modified OPV 130.

In some embodiments, the polymer layer 110 may comprise a post-industrial resin or a post-consumer resin (PCR). In an embodiment, the polymer layer 110 comprises virgin polymer. In an embodiment, the polymer layer 110 comprises a combination of virgin polymer and PCR. In an embodiment, the polymer layer 110 comprises polyethylene terephthalate (PET). In an embodiment, the polymer layer 110 may comprise 100% PET. In an embodiment, the polymer layer 110 may comprise 100% polypropylene (PP). In an embodiment, the polymer layer 110 may comprise primarily PET with a high-density polyethylene (HDPE) component and a compatibilizer. In another embodiment, the polymer layer 110 comprises HDPE, polyethylene terephthalate (PET) or a PE/PET blend. In an embodiment the polymer layer 110 comprises amorphous polyethylene terephthalate (APET). In some embodiments, the polymer layer may comprise polystyrene, and/or polyacrylic. Any polymer known in the art may be utilized herein. In an embodiment, the polymer layer 110 may include an oxygen scavenger. In an embodiment, the polymer layer 110 may contain a color component.

In some embodiments, the polymer layer 110 may comprise one or more cap layers 105a, 105b on either side of the polymer layer 110. In some embodiments, an external cap layer 105a disposed on an outer surface 110a of the polymer layer 110, and an internal cap layer 105b disposed on an inner surface 110b of the polymer layer 110. In an embodiment, the external cap layer 105a may comprise the food contact side of the resulting formable sheet or the packaging structure. The external cap layer 105a may comprise a food contact layer and a sealing layer for peelable film lidding. In some embodiments, the cap layer 105a, 105b may comprise PCR and, optionally, a polyolefin. In an embodiment, the PCT in the cap layer 105a, 105b comprises virgin PCR. In an embodiment, the PCR in the cap layer 105a, 105b comprises high density polyethylene (HDPE). In an embodiment, the cap layer 105a, 105b may comprise 100% HDPE. In an embodiment, the cap layer 105a, 105b may comprise primarily HDPE with a minor PET component and a compatibilizer. In another embodiment, the PCR in the cap layer 105a, 105b comprises polyethylene (PE) or a PE/PET blend. In an embodiment, the cap layer 105a, 105b may include an oxygen scavenger. In an embodiment, at least one of the polymeric layer 110, and/or the cap layer 105a, 105b may comprise a coloring agent. Any coloring agent known in the art may be utilized.

In an embodiment, the thickness of the cap layer 105a, 105b may be between 2 and 5 mils. In another embodiment, the thickness of the cap layer 105a, 105b may be between 3 and 4 mils. In an embodiment, the thickness of the cap layer 105a, 105b may comprise between about 5% to about 20% of the thickness of the total thermoformable polymeric sheet 100 or container. In an embodiment, if the cap layer 105a, 105b is a blend of HDPE, PET, and compatibilizer, the HDPE may be oriented to the outermost portion of the cap layer 105a, 105b, opposite the polymeric layer 110. In an embodiment, this orientation hides imperfections in the color of the regrind (i.e., recycled scrap from post-trim operations) from the view of the consumer.

In an embodiment, the total thickness of the thermoformable polymeric sheet 100 may be between 10 and 30 mils. In a particular embodiment, the total thickness of the thermoformable polymeric sheet 100 may be between 12 and 14 mils. In another embodiment, the total thickness of the thermoformable polymeric sheet 100 may be about 13 mils. In an embodiment the total thickness of the thermoformable polymeric sheet 100 may be between 15-30 mils. In a particular embodiment, the total thickness of the thermoformable polymeric sheet may be about 24 mils.

In some embodiments, the barrier layer 120 may be disposed adjacent the inner surface 110b of the polymer layer 110, while in other embodiments the barrier layer 120 may be disposed adjacent the inner cap layer 105b. In some embodiments, the barrier layer 120 may be water-based. In some embodiments, polyethylene imine (PEI) and polyvinyl alcohol (PVOH) may be layered on to either the internal cap layer 105b or the polymeric sheet layer 110 to create the barrier layer 120. In some embodiments, the PEI may be applied, preferably as a primer layer, dried, and then overcoated with PVOH, which may then be dried. In another embodiment the PEI and PVOH may be mixed into a mixture, and applied to either the internal cap layer 105*b* or the polymeric layer 110. In some embodiments, the barrier layer 120 may be applied to a thickness between 2-3 microns.

In an embodiment, the inventive solution may comprise about 1% to 5% PEI by weight of the barrier layer 120 and about 5% to 20% PVOH by weight of the barrier layer 120, with the balance of the solution being water and other optional agents unassociated with barrier properties or adhesion. In another embodiment, the inventive coating solution may comprise about 2% to 4% PEI by weight of the barrier layer 120 and about 7% to 15% PVOH by weight of the barrier layer 120, with the balance of the solution being water and other optional agents unassociated with barrier properties or adhesion. In still another embodiment, the inventive solution may comprise about 2% PEI by weight of the barrier layer 120 and about 10% PVOH by weight of the barrier layer 120, with the balance of the solution being water and other optional agents unassociated with barrier properties or adhesion.

In some embodiments, the modified OPV 130 may be disposed on the barrier layer 120. The modified OPV (also referred to as an overcoat, or overlacquer) may be layered onto the barrier layer 120 to create an outer coating configured to protect the barrier layer 120 from exposure to external forces. In some embodiments, the modified OPV 130 may be applied to the barrier layer 120 once the barrier layer 120 is fully dried. In some embodiments, the barrier layer 120 and the modified OPV 130 may be applied with the same equipment, and in other embodiments, may be applied by separate equipment.

In an embodiment, the modified OPV 130 completely coats the dry barrier layer 120 at a sufficient thickness to maintain coverage of the OPV 130 on the barrier layer 120 after thermoform stretching. In some embodiments, undercoating may lead to exposure of the barrier layer 120 after stretching (e.g., thermoforming). Exposure of the barrier layer 120 may give the sheet product or thermoformed product an unwanted tacky feel, and may induce the barrier layer to transfer to a wet surface upon contact (e.g., hands and/or counter tops). Use of a modified OPV 130 may not only improve the barrier durability but may also limit or eliminate any unwanted tacky feel or barrier transfer.

In some embodiments, the thickness of the modified OPV 130 is correlated to the chemical properties and grade of the selected base OPV and specifically the stretch properties during thermoforming. For example, a base OPV with greater stretch properties will need a smaller thickness than a base OPV with lesser stretch properties, as the base OPV, and thus the modified OPV, will be more adaptable. In some embodiments, the surface area of the modified OPV may be configured to stretch locally without cracking and/or removing, exposing, or uncovering the barrier layer 120. In some embodiments, the modified OPV may stretch up to 2.5 times the surface area, up to 3 times the surface area, up to 5 times the surface area, up to 7 times the surface area, and even up to 9 times the localized surface area and remain intact about the product.

In some embodiments, the modified OPV 130 may be applied to the barrier layer 120 with a thickness of up to 10 microns, up to 8 microns, up to 6 microns, up to 5 microns, or up to 3 microns. In an embodiment, the modified OPV 130 may be applied to the barrier layer 120 with a thickness of between 2 microns and 6 microns. In an embodiment, the modified OPV 130 may be applied to the barrier layer 120 with a thickness of between 3 microns and 5 microns. The thickness modified OPV 130 may reduce between 40-55% during drying, depending on the chemical properties thereof. In some embodiments, the thickness of the wet modified OPV will be approximately double that of the desired dried modified OPV thickness.

In some embodiments, the dried modified OPV 130 may have a thickness of at least 1 micron to maintain coverage of the barrier layer 120 during stretching and thermoforming. In some embodiments, the dried modified OPV 130 may have a thickness of at least 1.5 microns 2.5 microns, at least 3 microns, or at least 5 microns. In some embodiments, the dried thickness of the modified OPV 130 may be between 1.5 microns and 2.5 microns. In some embodiments, the dried thickness required may depend on the composition of the base OPV and the quantity of inorganic particles, and/or additive in the base OPV. In some embodiments, the modified OPV 130 may be applied such that after stretching, the modified OPV has a thickness of than 2.5 microns, at least 3 microns, or even at least 5 microns.

Figure 4:
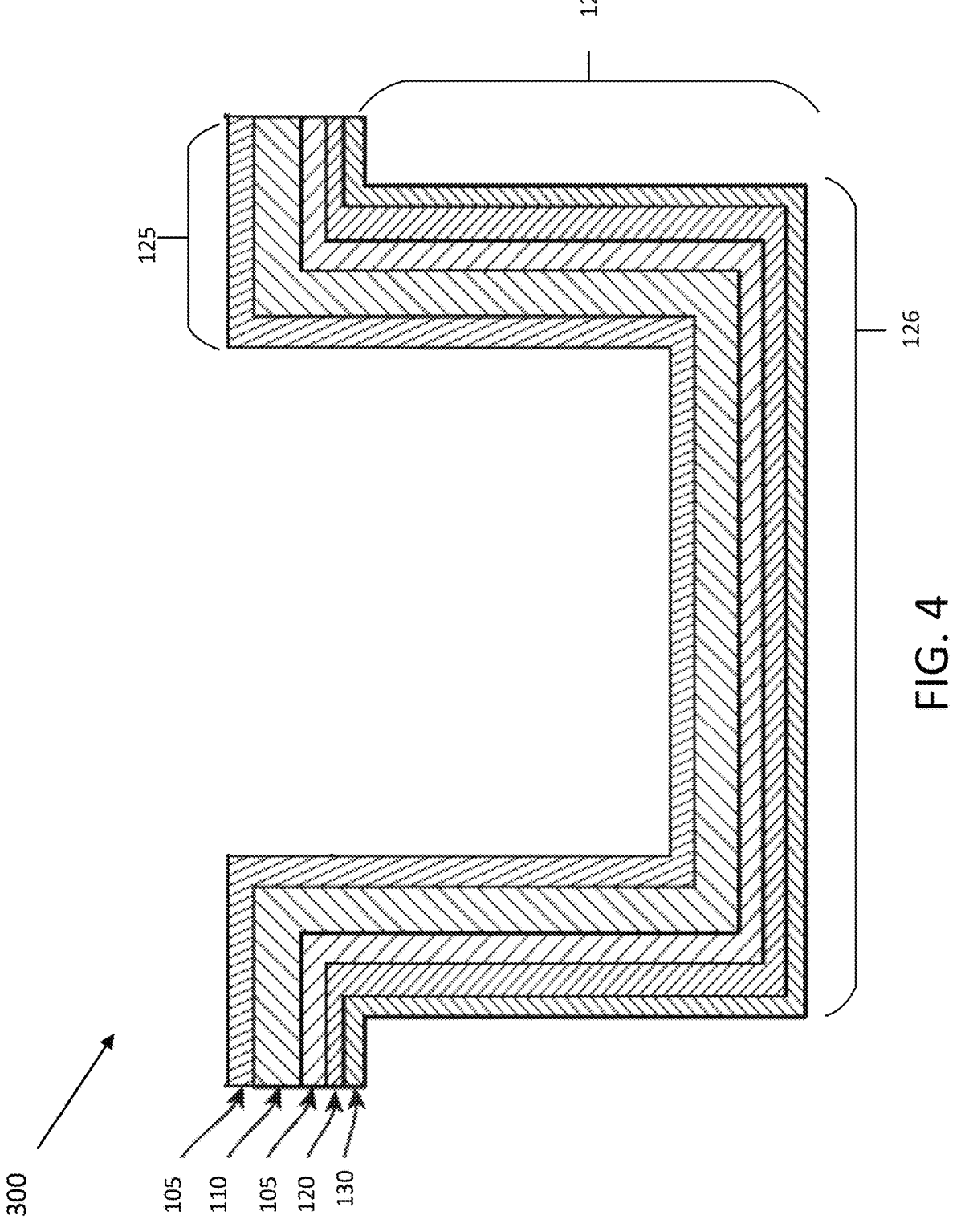
FIG. 4 illustrates cross-sectional view of an example container in accordance with some embodiments of the present invention.

With reference to FIG. 4, in some embodiments, the modified OPV 130 and/or barrier layer 120 may have varying thicknesses across each thermoformed container 300. For example, the thickness of the modified OPV 130 and/or the barrier layer 120 may be thicker along the flange 125, than through the body 127 of the container and/or the base 126 of the container, due to the stretching which occurs in the body 127 and base 126 during thermoforming.

Returning to FIG. 1, in some embodiments, the modified OPV 130 thickness may be balanced against drying inefficiency and cracking tendencies of dry and thicker modified OPV's. In some embodiments, the modified OPV may define a maximum thickness determined by cracking when dry, and drying inefficiencies (e.g., not fully drying; tacky).

The modified OPV 130 may be fully dried before the formable sheet 100 undergoes any forming process. When dried, the modified OPV 130 may be neutral to any forming process. The modified OPV 130 may be compatible with the recycle process, such that the sheet product 100 remains recyclable in the normal stream.

In some embodiments, the surface temperature of the modified OPV 130 may be measured to ensure thorough drying. In some embodiments, the modified OPV 130 surface temperature is at least 90° C. to be considered dry. In some embodiments, when the surface is over 100° C., over 110° C., over 120° C. or over 130° ° C. the modified OPV 130 may be considered to be dry. In some embodiments, the modified OPV 130 may be dry when the surface temperature is between 100-110° C., or between 95-115° C. In some embodiments, the modified OPV 130 may be dry when the surface temperature of the modified OPV 130 is at least 110° C. The modified OPV 130 may be dried using any temperature/time combination known in the art. For example, the drying may be accomplished via a longer time period at a lower temperature, or at a higher temperature for a shorter time period. In any case, a dried coating should be free of tack and be suitable for rolling into a roll without any blocking/sticking which could prevent unrolling of the roll.

In some embodiments, different modified OPV compositions may have different drying characteristics. In some embodiments, the modified OPV 130, and therefore the formable sheet 100 may be dry, when the formable sheet 100 is able to be rolled and/or stacked such that the modified OPV 130 does not stick or attach to the alloy layer of the sheet adjacent it. Said differently the modified OPV 130 may be configured for improved denesting properties.

Various overprint varnishes present different desirable qualities, and may be chosen to achieve various goals, and for compatibility for the various final products.

In some embodiments, a base OPV may be modified to reduce the transfer of the OPV, and/or the barrier layer to wet surfaces, by adding a moisture resistant agent to the base OPV. In some embodiments, the moisture resistant agent may be a plurality of particles, a liquid dispersion or similar. In some embodiments, illustrated in FIGS. 2A-C, the modified OPV 230 may comprise a moisture resistant agent suspended in a base OPV. In some embodiments, the base OPV may be a water-based solution, suspension or dispersion and in other embodiments may be a water-based emulsion. In an embodiment, the modified OPV 230 may avoid the use of water solution stabilizers that can cause damage to the barrier layer or discoloration during forming.

In some embodiments, the base OPV may be an emulsified, heterogenous system of polymeric droplets 240 in water 245. In some embodiments, the base OPV may be adversely affected by changing the charge characteristic of the system, brought on by PEI, or similar adhesion promoters. Further, any transfer of the modified OPV to the consumer may encourage degradation of the barrier layer, as water may attack and penetrate the barrier layer, causing the additional transfer of the barrier layer 120 in addition to the modified OPV. Therefore, in some embodiments, the modified OPV does not contain or contact PEI or other adhesion promotors so as to maintain stability of the OPV.

Figure 2A:
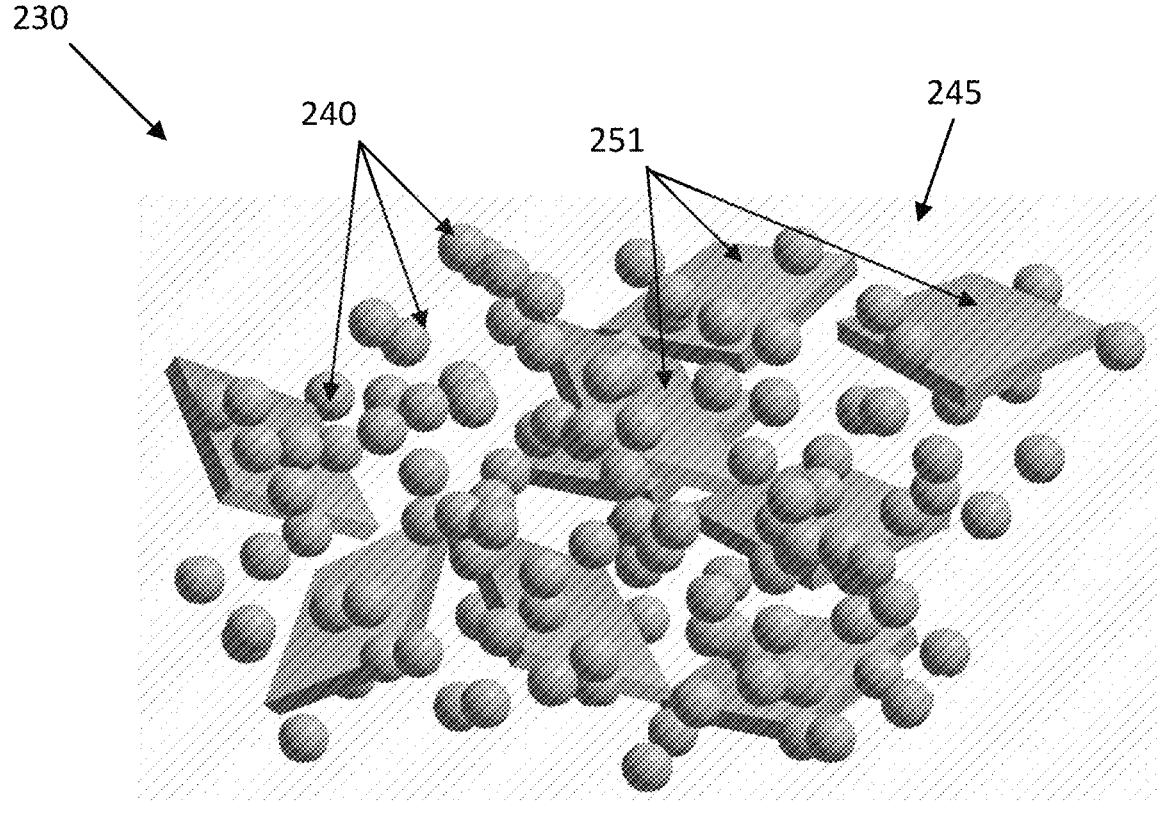

As illustrated in FIG. 2A the modified OPV 230 may comprise a moisture resistant agent configured as a plurality of inorganic particles 251, 252, 253 suspended in an emulsified heterogenous system of polymeric droplets 240. In some embodiments, polymeric droplets 240 may surround the plurality of inorganic particles 251. In some embodiments, the inorganic particles 251, 252, 253 may be for example, talc 251, illustrated in FIG. 2A, wax 252, illustrated in FIG. 2B, silicon dioxide 253, illustrated in FIG. 2C, or similar. The polymeric droplets 240 may entrap the plurality of inorganic particles 251, 252, 253, while not adhering thereto. In some embodiments, illustrated in FIG. 2B the plurality of inorganic particles 252 may be coated in a fatty acid 255, for example stearic acid.

In some embodiments, the base OPV may be an acrylic emulsion comprising a thickener, while in other embodiments the base OPV may be an acrylic emulsion without a thickener. In some embodiments, the thickener may be a hydroxyl ether cellulose. The addition of the thickener to the base OPV may yield a higher viscosity base OPV in contrast to the base OPV without a thickener. In some embodiments, the base OPV may be a polyacrylic water-based emulsion. The polyacrylic water-based emulsion may comprise a water dispersed system with up to 40% polyacrylic content by weight, up to 50% polyacrylic content by weight, or up to 60% poly acrylic content by weight. In some embodiments, the polyacrylic water-based emulsion may comprise at least 20% polyacrylic content by weight, at least 30% polyacrylic content by weight, or at least 40% polyacrylic content by weight. In some embodiments, the polyacrylic water-based emulsion may comprise 46% polyacrylic content. In some embodiments, the remainder of the base OPV may be water (e.g., 245). In some embodiments, other additives including surfactants and stabilizers may be added to the base OPV. In some embodiments, the polymeric droplets 240 may create droplets having a diameter between 20-200 nm, between 30-190 nm, or between 40-180 nm. In some embodiments, the base OPV may define an average particle diameter between 60-120 nm, between 70-110 nm, or even between 80-100 nm.

In another embodiment the base OPV may be polyvinyl acetate-polyethylene copolymer. In some embodiments, the polyvinyl acetate-polyethylene copolymer may comprise at least 35% active solids, at least 45% active solids, or even at least 55% active solids content. In some embodiments, the base OVP may comprise droplet diameter size of between 20-200 nm in size, between 30-190 nm, or between 40-180 nm. In some embodiments, the OPV 132 may define an average particle diameter size between 60-120 nm, between 70-110 nm, or even between 80-100 nm In some embodiments, the modifier for the OPV may be a moisture resistant agent 250. In some embodiments, the moisture resistant agent 250 may be an inorganic particle. In some embodiments the inorganic particle may be talc 251, as illustrated in FIG. 2A. In some embodiments, the talc particles 251 may define a high aspect ratio which may be favorable to be entrapped by the OPV. Further, talc comprises a flat plane which may efficiently cover the surface of the barrier layer 130 after the polymeric sheet is thermoformed, as the particles may stack more tightly and align. Therefore, the talc may cover a portion of the container in contact with the consumer, reducing the amount of contact between the base OPV and the consumer, and thereby reducing the amount of potential modified OPV to be transferred from the container to the consumer or surface.

In some embodiments, the talc particles 251 may define a particle size between 500-10,000 nm, between 750-8,000 nm, or even between 1,000-7,000 nm. In some embodiments, the talc particles 251 may define an average size between 900-1,500 nm, 1,000-1,400 nm or between 1,100-1,300 nm. In some embodiments, during mixing the talc particles 251 may become fragmented, so the resulting thickness, width, and length rations may vary depending on the mixing type, mixing forces, and even the application type or forces.

In some embodiments, the talc particles 251 may be coated with a fatty acid, for example stearic acid. The fatty acid coating may prevent the base OPV droplets from binding to the inorganic particles, and thus there is less interaction between the talc and the base OPV, and the talc is less likely to disrupt the emulsion and/or cause the emulsion to fail (e.g., separation of the acrylic and water).

An additional benefit of talc may be absorbency. To explain, talc is able to absorb and trap moisture, thus any moisture which engages with the talc is absorbed, rather than breaking down and/or attacking the OPV, and/or penetrating the OPV to attack the barrier layer 130. Further, as the talc particles are entrapped by the OPV and are not able to move, the moisture may stay within the talc, and not transfer to the OPV and/or the barrier layer. Thus, talc particles may isolate the acrylic OPV, residual surfactants and stabilizers, and therefore retard the transfer to wet hands and/or other surfaces.

Figure 2B:
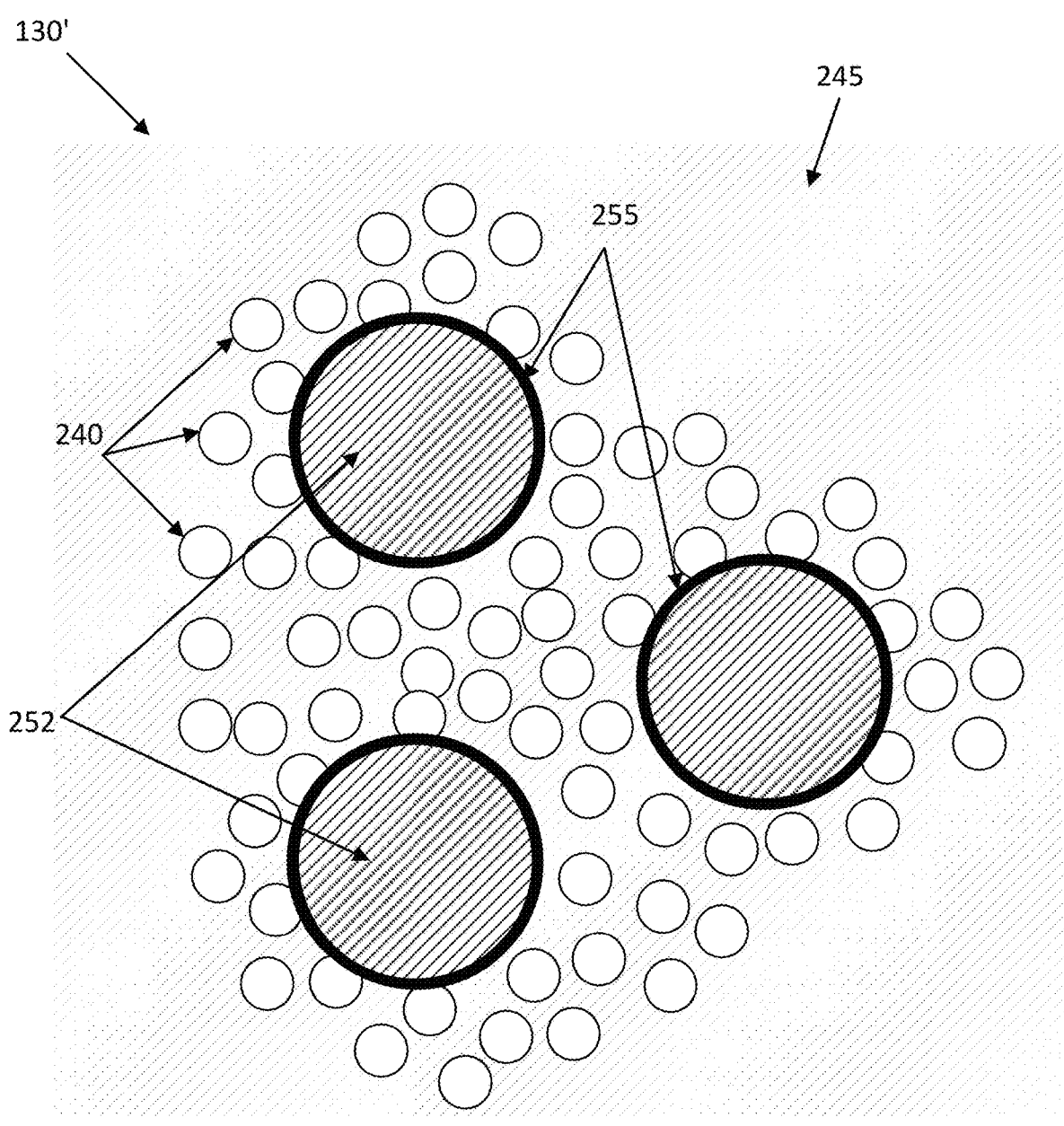

In some embodiments, illustrated in FIG. 2B, the moisture resistant agent may be wax. In some embodiments, the wax may be configured as a wax particle 252 or in other embodiments, as a liquid wax dispersion in the OPV emulsion, for example a water-based liquid microcrystalline polyethylene wax. In some embodiments, the wax may be an FDA wax particle. The wax particles 252 may define a spherical or semi-flat structure that may be effective to reduce the OPV transfer from the container to the consumer, and/or surfaces.

In some embodiments, as the modified OPV layer is dried the wax may form a semi-continuous shield. In some embodiments, wax particles 252 may remain more uniformly dispersed within the OPV prior to application, in comparison to talc particles. To explain, the specific gravity of wax may be closer to the specific gravity of the OPV 132 when compared to the specific gravity of talc, thus rather than settle within the OPV the wax particles may remain suspended and mixed. In some embodiments, the wax particles may be for example, a micronized wax having a melting temperature of 110 C and a particle size between 3,000-1500 nm, between 5,000-13,000 nm and between 6,000-12,000 nm.

Figure 2C:
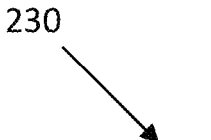
Figure 2C:
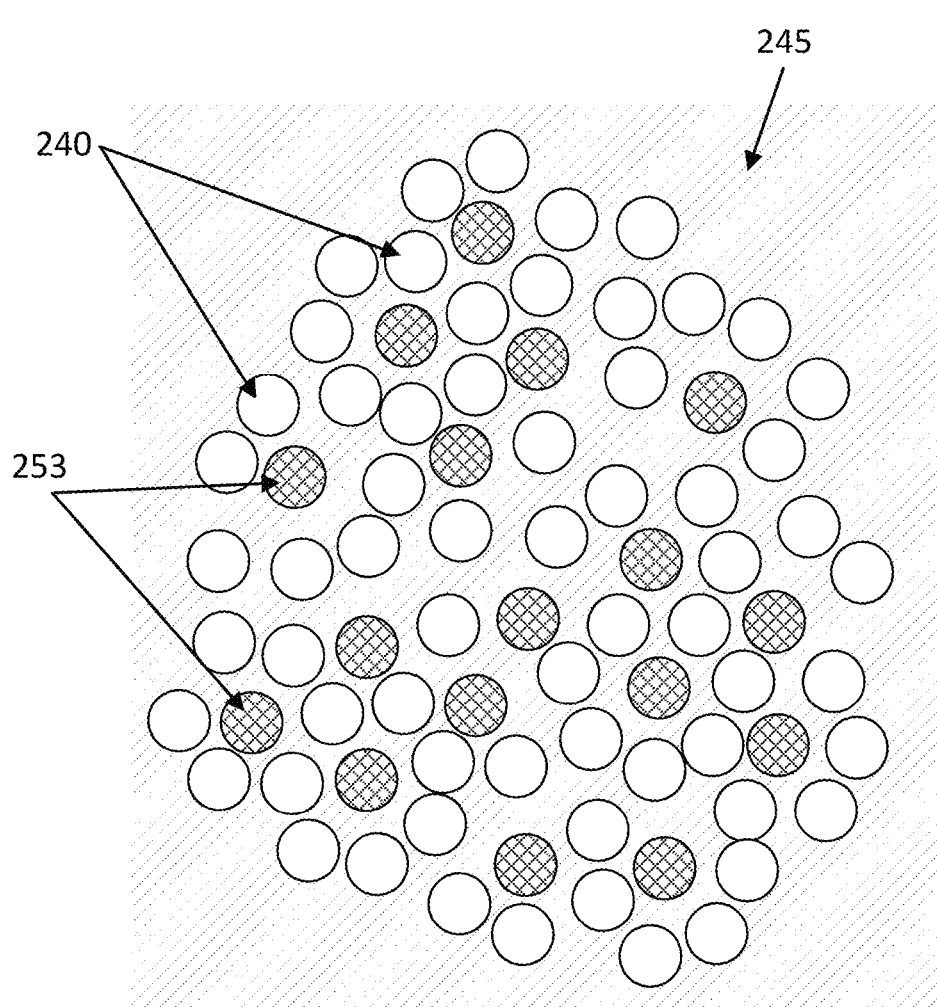

In some embodiments, as illustrated in FIG. 2C, the moisture resistant agent may be silicon dioxide 253. Silicon dioxide 253, similarly to talc, may have a higher specific gravity than the OPV emulsion, and thus, may separate and/or settle more quickly than wax. However, an anticaking silicon dioxide may have a much smaller particle size in comparison to talc, and wax. For example, in some embodiments silicon dioxide particles may be between 10-200 nm. The silicon dioxide, defining similar particle size to the polymeric droplets 140 may encourage migration of the silicon dioxide into the OPV. In some embodiments, the silicon dioxide may comprise a non-polar coating, such as to not break the emulsion. In some embodiments, the silicon dioxide may be coated with a fatty acid, for example stearic acid.

In some embodiments, the moisture resistant agent may be an inorganic micro particle such as a Microthene® FA 700-00 produced by LyondellBasell. In some embodiments, the micro particle may comprise a particle size between 5,000-50,000 nm with an average particle size of 20,000 nm.

In some embodiments, it may be desirable for the moisture resistant agent 250 to remain suspended within the base OPV 240 until application of the modified OPV to the barrier layer 120 and drying thereof. Two factors which may influence settling time are the amount of polymeric droplets 240 and the specific gravity of the moisture resistant agent 250. A higher the quantity of polymeric droplets 240 will yield less settling of the moisture resistant agent 250. Additionally, when the specific gravity of the moisture resistant agent is closer to the specific gravity of water, the moisture resistant agent will remain suspended in the base OPV longer, as the moisture resistant agent exhibits similar properties.

In some embodiments, the moisture resistant agent 250 may remain suspended within the base OPV 240, by increasing the viscosity of the base OPV, and further increasing the forces within the base OPV due to the moisture resistant agent 250 from being entrapped.

Figure 3A:
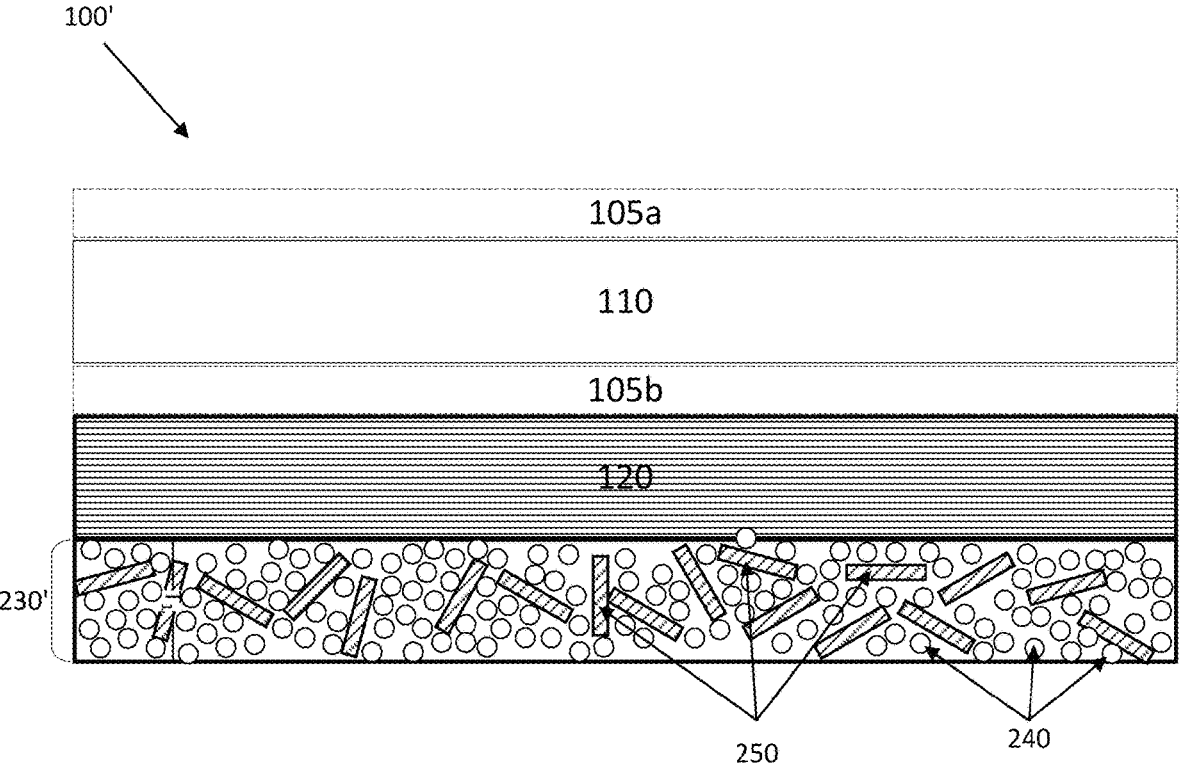
FIG. 3A illustrates an example overprint varnish after application, in accordance with some embodiments of the present invention.
Figure 3B:
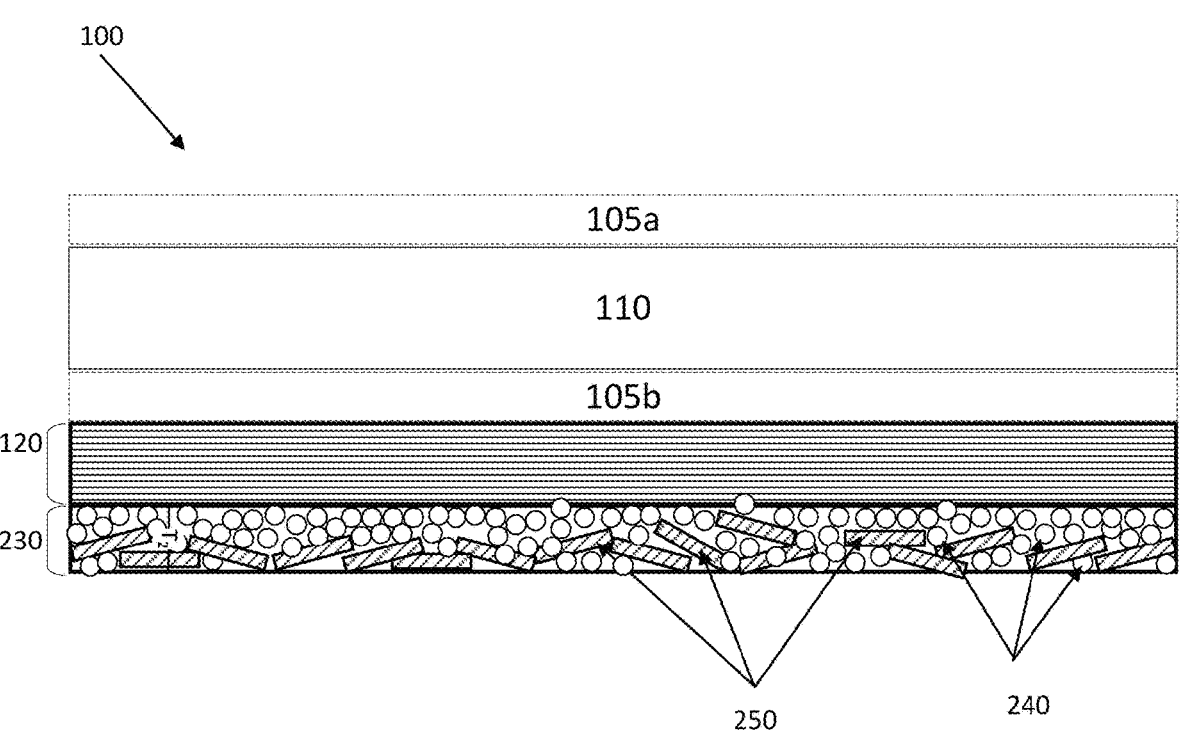
FIG. 3B illustrates the example overprint varnish after drying, in accordance with some embodiments of the present invention.

Upon application of the modified OPV to the barrier layer 120 and drying thereof the moisture resistant agent 250 may form a surface shield between the consumer and the base OPV. To explain, with reference to FIGS. 3A-C, the liquid modified OPV 230' is applied to the barrier layer 120 of the polymeric sheet 100'. As shown in FIG. 3A, the liquid modified OPV 230' comprises the moisture resistant agent 250 suspended in the base OPV 245, 240. After application, the polymeric sheet 100' is dried, during which the water 245 may evaporate from the base OPV and the polymeric droplets 240 may coalesce into a film about the moisture resistant agent 250, illustrated in FIG. 3B. The moisture resistant agent 250 may create a surface shield within the coalesced film, and further, may prevent a portion of the film from contacting the consumer and/or surfaces.

Figure 3C:
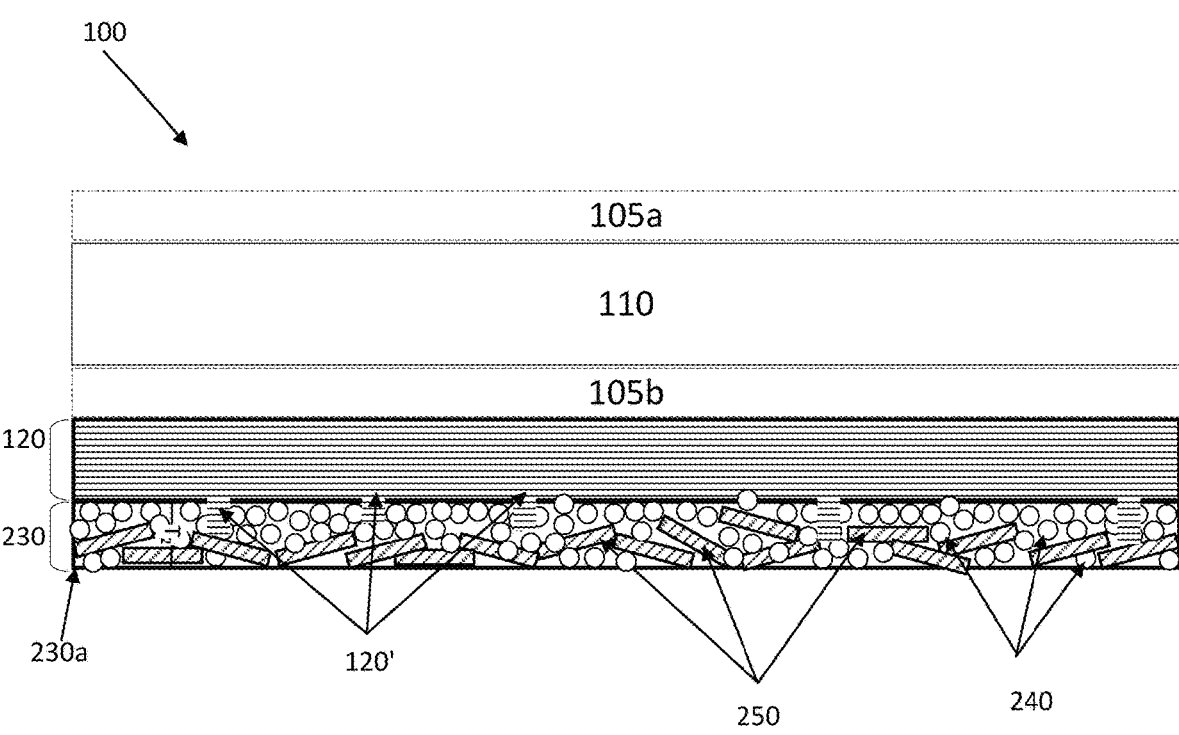
FIG. 3C illustrates the interaction between the barrier layer and the overprint varnish after drying, in accordance with some embodiments of the present invention.

Without wanting to be bound by theory, it is believed the moisture resistant agent 250 may block the barrier layer 120 from penetrating through the OPV 230 through to an external surface 230a (e.g., the surface which is handled by the consumer). In this regard, as illustrated in FIG. 3C, the barrier layer 120 may begin to migrate 120' into and through the OPV 230 upon application, as the OPV 230 is "wet" (e.g., contains water). However, upon drying of the OPV 230 the moisture resistant agent 250 effectively forms a shield between the migration 120' of the barrier layer and the external surface 230a of the OPV 230 thereby preventing the barrier layer 120 from reaching the external surface 230a and thus, reducing the tacky feeling.

In this regard, the thickness $T_1$ of the OPV 230 as initially applied to the barrier layer 120 must be great enough such that the barrier layer 120 cannot migrate 120' all the way through the OPV layer 230 prior to drying, thereby preventing the barrier layer from reaching the external surface 230a. Similarly, the thickness $T_1$ of the OPV 230 must be great enough such that upon drying (e.g., reduction in thickness) the portion of the barrier layer 120' which migrated through the OPV does not become the external surface 230a.

Figure 5:
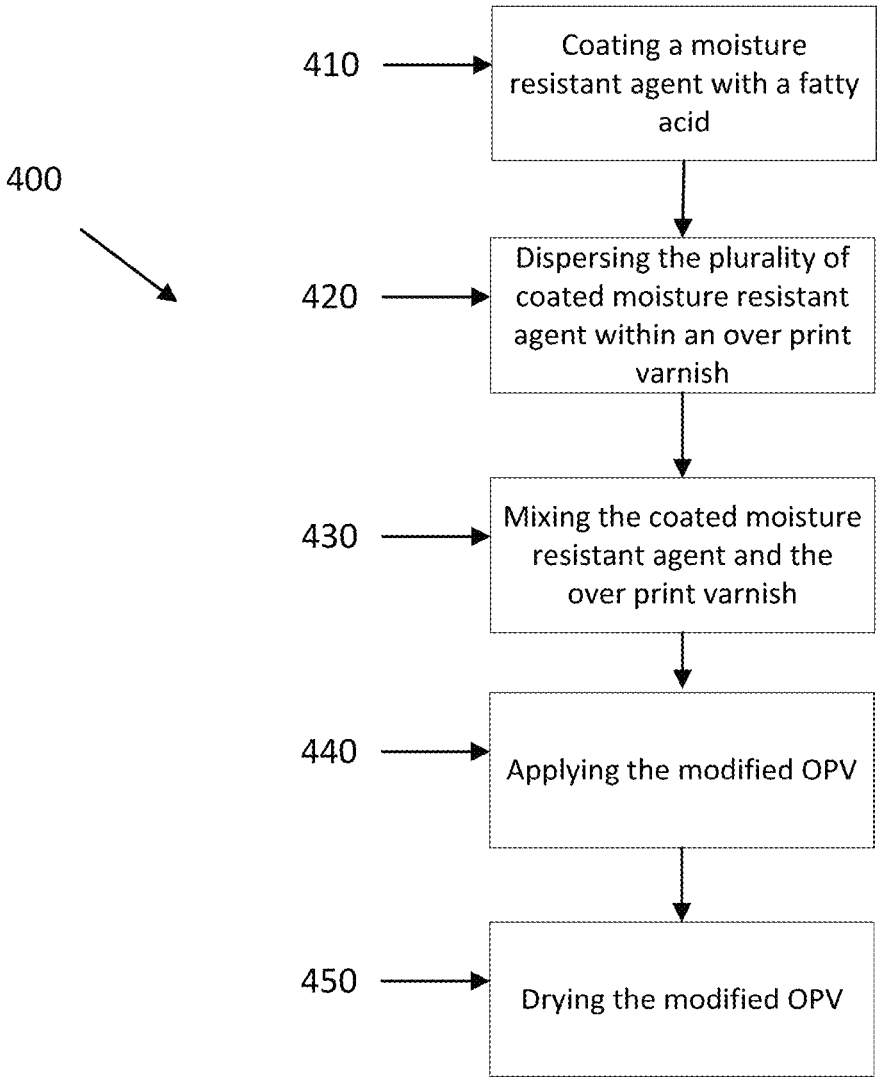
FIG. 5 illustrates a flowchart of an example method of forming an example modified overprint varnish comprising the inventive composition, in accordance with some embodiments of the present invention.

In some embodiments, the modified OPV may comprise a variety of steps illustrated in FIG. 5. At operation 410, a moisture resistant agent may be coated with a fatty acid. In some embodiments, the moisture resistant agent may be one of talc, wax, or silicon dioxide. In some embodiments, the fatty acid may be stearic acid or the like. At operation 420 the coated moisture resistant agent may be dispersed within base OPV. In some embodiments, the base OPV may be an acrylic emulsion, while in other embodiments the base OPV may be a polyvinyl acetate-polyethylene copolymer emulsion. At operation 430 the coated moisture resistant agent may be mixed with the base OPV to form a modified OPV. In some embodiments, a sonicator may be used to disperse the coated moisture resistant agent throughout the base OPV emulsion. In some embodiments, coated moisture resistant agent comprising wax, and/or silicon dioxide may be sonicated for a greater time than a talc particle, as talc is a more brittle material. In some embodiments, a defoamer may be added into the base OPV to reduce foaming. In some embodiments, surfactants may be added to the base OPV, while in other embodiments no surfactants may be necessary. At operation 440 the mixture may be applied to a polymeric sheet. In some embodiments, the mixture may be applied using a smooth rod or roll, which may rotate such that the rod or roll does not drag across the modified OPV. In some embodiments, the modified OPV may be applied with a wire rod defining a large wire size, such that the inorganic particles may be released from the rod without clogging the holes (e.g., US #12), In some embodiments, the rod may define a large radius, to smoothly apply the modified OPV to the polymeric sheet. At operation 450 the modified OPV may be dried. In some embodiments, drying the modified OPV allows the water in the OPV emulsion to evaporate, creating a solid modified OPV comprising the polymeric droplets and the moisture resistant agent.

Forming and Filling

In some embodiments, systems, tooling, and methods are provided for manufacturing container 300, such as a single serving container or a tray of containers, using a thermoforming process or similar. Generally speaking, a thermoforming device can be any device or mechanism that is used to form the formable sheet into a specific shape in a mold. A thermoforming device provides a shape transformation and in some cases the depth of the formed container exceeds the diameter of the formed container. The layers of the formable sheet experience stresses as they are stretched and formed and must be configured to withstand the thermoforming process.

Figure 6:
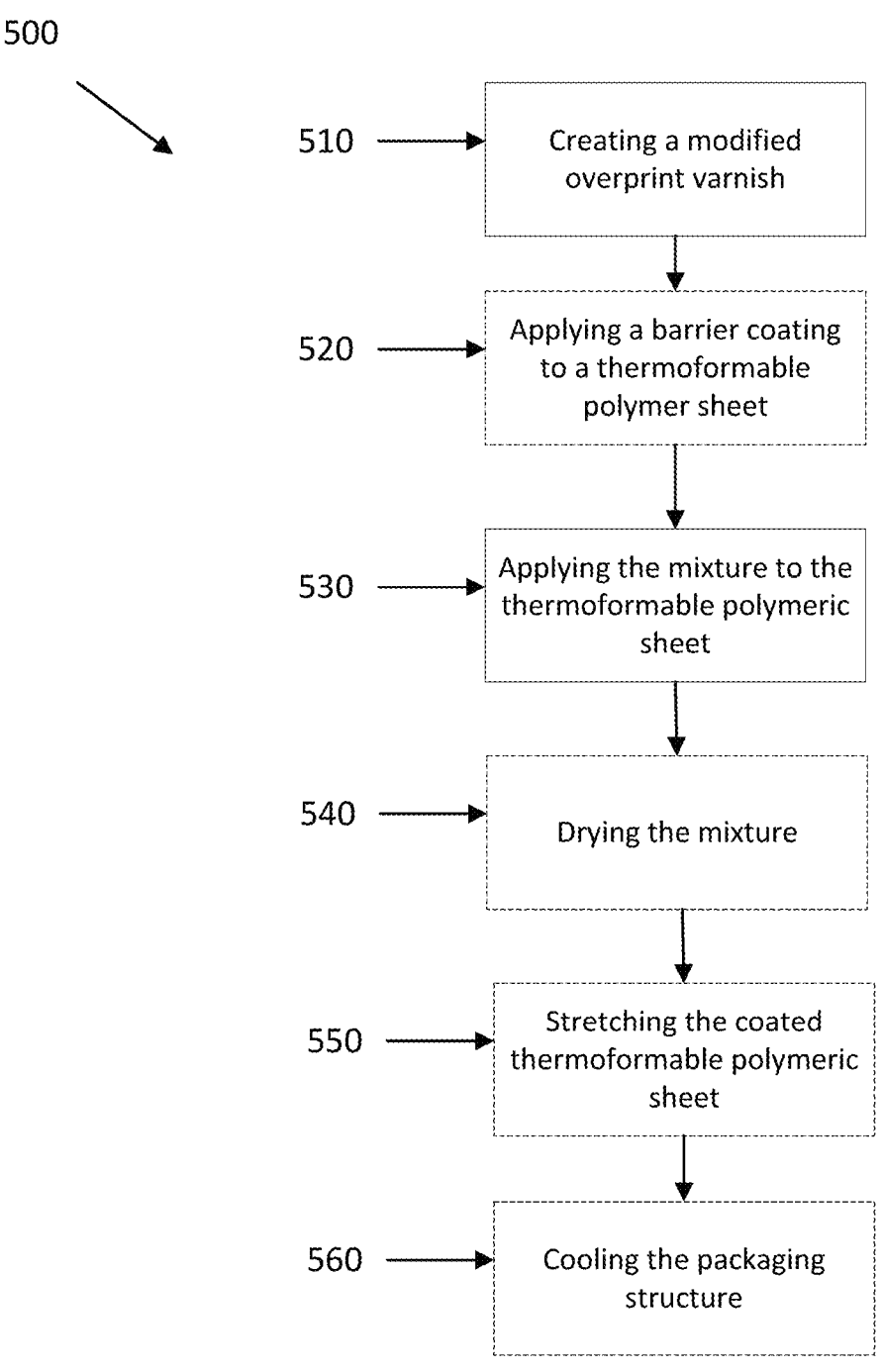
FIG. 6 illustrates a flowchart of an example method of forming an example packaging structure comprising the inventive composition, in accordance with some embodiments of the present invention.

In an embodiment, the method of making a filled container 300, illustrated in FIG. 4 may comprise a variety of steps as illustrated in FIG. 6. At operation 510, a modified OPV may be mixed. In some embodiments, the modified OPV may be made in accordance with the method of making a modified OPV 500 illustrated in FIG. 5. Optionally at operation 520 a barrier layer may be applied to a polymeric sheet. In some embodiments, the barrier layer may be applied via a gravure system, Mayer rod system, sprayed or extrusion coated on to the polymeric layer. In some embodiments, after application the barrier layer may be dried. At operation 530 the modified OPV mixture may be applied to the thermoformable polymeric sheet. In some embodiments, the modified OPV mixture may be applied to the polymer layer, while in other embodiments the modified OPV mixture may be applied to the dried barrier layer. In some embodiments, the modified OPV mixture may be applied the barrier layer before drying. At operation 540 the modified OPV mixture is dried. As explained with relation to FIG. 5, drying the modified OPV mixture causes the water to evaporate yielding a solid modified OPV where the particles create a surface shield.

At operation 550 the coated thermoformable polymeric sheet may be heated and stretched into a packaging structure shape. Optionally at step 560 the packaging shape may be cooled.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method of forming a modified over print varnish, the method comprising:
   coating a moisture resistant agent selected from talc, wax, or silicon dioxide with a fatty acid;
   dispersing the coated moisture resistant agent in an over print varnish comprising a water-based emulsion of polymeric droplets;
   mixing the coated moisture resistant agent and the over print varnish to form a mixture, wherein the fatty acid coating prevents a disruption of the water-based emulsion of polymeric droplets during mixing; and
   drying the mixture to evaporate at least some of the water from the over print varnish to form a continuous film with the coated moisture resistant agent entrapped therein, wherein the modified over print varnish provides resistance to both oil and water transfer.

2. The method of claim 1, wherein the mixing step creates a heterogenous system.

3. The method of claim 1, wherein during the drying step, the polymer droplets coalesce into a film.

4. The method of claim 1, wherein the over print varnish is selected from the group consisting of an acrylic emulsion, acrylic emulsion with a thickener, and a polyvinyl acetate-polyethylene copolymer.

5. The method of claim 1, wherein the polymeric droplets provide a solids content between about 40% and about 60% of the total over print varnish.

6. The method of claim 1, wherein the polymeric droplets are liquid droplets with a size of between about 20 nm and about 200 nm.

7. The method of claim 1, wherein the moisture resistant agent is a plurality of particles.

8. The method of claim 7, wherein the plurality of particles have a flat plane.

9. The method of claim 7, wherein the plurality of particles are spherical particles.

10. The method of claim 7, wherein the plurality of particles are talc particles having a size between about 1 um and 7 um.

11. The method of claim 1, wherein the fatty acid coating prevents the moisture resistant agent from binding to the polymeric droplets.

12. The method of claim 1, wherein the moisture resistant agent is wax.

13. The method of claim 1, wherein the fatty acid comprises stearic acid.

14. The method of claim 1, further comprising drying the fatty acid coating before dispersing the coated moisture resistant agent.

* * * * *